United States Patent [19]

Pund et al.

[11] Patent Number: 5,165,519
[45] Date of Patent: Nov. 24, 1992

[54] MOVING STRIP CULLING APPARATUS

[76] Inventors: Ralph L. Pund, Rte. 1 Box 193 B, Ferdinand, Ind. 47532; Greg A. Krodel, 715 Clay, Jasper, Ind. 47546; Reed D. Hughes, Rte. 10 Box 365 E, Crossville, Tenn. 38555

[21] Appl. No.: 796,196

[22] Filed: Nov. 22, 1991

[51] Int. Cl.⁵ .............................................. B65G 47/26
[52] U.S. Cl. ............................... 198/457; 198/458; 198/719; 209/521; 83/107
[58] Field of Search ............... 198/457–459, 198/718, 719; 209/521, 646, 700; 83/107

[56] References Cited

U.S. PATENT DOCUMENTS

| 2,499,694 | 3/1950 | Stenger | 198/719 |
|---|---|---|---|
| 3,812,951 | 5/1974 | Fullaway | 198/458 |
| 3,838,803 | 10/1974 | Berry | 198/458 |
| 3,960,263 | 6/1976 | Isaksson et al. | 198/718 |
| 4,083,275 | 4/1978 | Lingl | 199/458 |
| 4,250,988 | 2/1981 | Miaskoff | 198/719 |
| 4,352,447 | 10/1982 | Bonaddio et al. | 198/458 |
| 4,759,435 | 7/1988 | Cedrone | 198/459 |

Primary Examiner—Joseph E. Valenza

[57] ABSTRACT

A culling device for a conveyance apparatus which culling device includes cross transport apparatus carrying flexible fingers which have selected strength, position and speed to cull out selected objects being conveyed. In particular, elongated objects may be conveyed and culled.

5 Claims, 3 Drawing Sheets

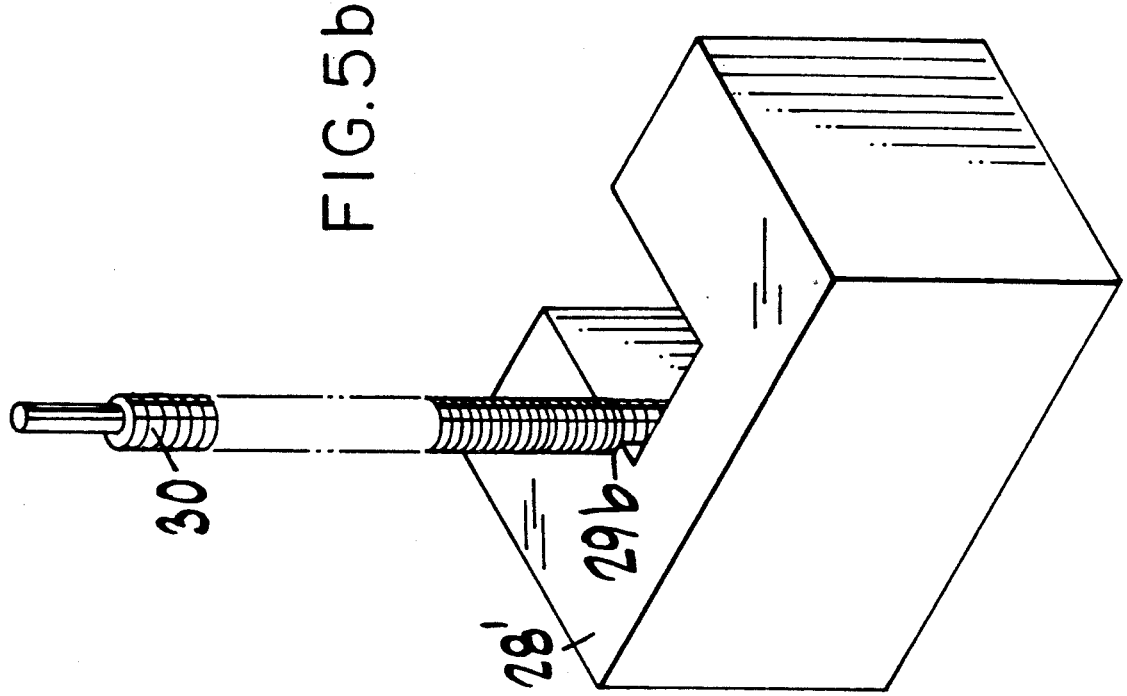
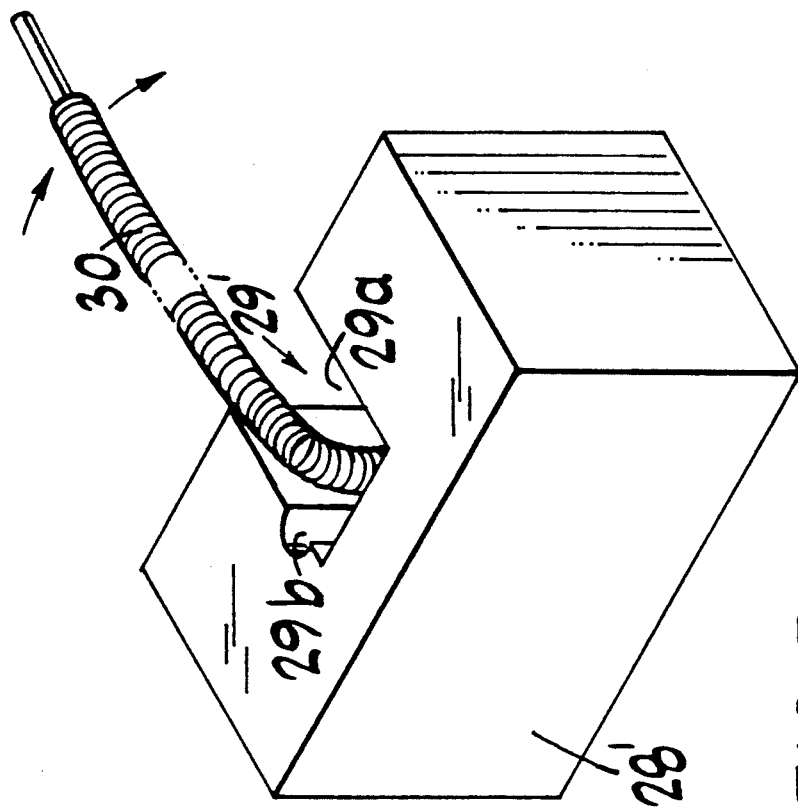

MOVING STRIP CULLING APPARATUS

BACKGROUND OF THE INVENTION

Strip edge separating and strip picking apparatus is old (U.S. Pat. Nos. 3,017,909; 3,101,755; and 3,139,125). Other conveying systems have used moving fingers for conveying purposes (U.S. Pat. No. 2,499,694) and it has been suggested that conveyor fingers be spring-loaded to avoid breakage of the fingers (U.S. Pat. No. 1,358,167).

Strip edge conveyor systems have not provided means for automatically and selectively removing lighter objects while not removing heavier objects.

SUMMARY OF THE INVENTION

Broadly, the present invention is an apparatus for culling strip objects while such objects are being conveyed along with larger or heavier elongated objects. The apparatus includes flexible fingers mounted on one or more transverse carriers moving in opposite directions which fingers engage and move the strips off either side of the conveyor while engaging but not removing larger and heavier objects.

It is a feature that the fingers are adjustable vertically to vary the forces including lateral forces they exert on the objects being conveyed. The higher the spring is adjusted above the plane of the workpiece, the more mechanical advantage the workpiece has on the spring, resulting in less force on the workpiece. Conversely, the shorter the spring, the more force is exerted on the workpiece.

BRIEF DESCRIPTION OF THE DRAWINGS

FIG. 5a is a perspective view of an alternative finger holder with the finger deflected forward; and FIG. 5b is a view similar to FIG. 5a with the finger in a curved recess.

DESCRIPTION OF THE PREFERRED EMBODIMENT

Figure 1:
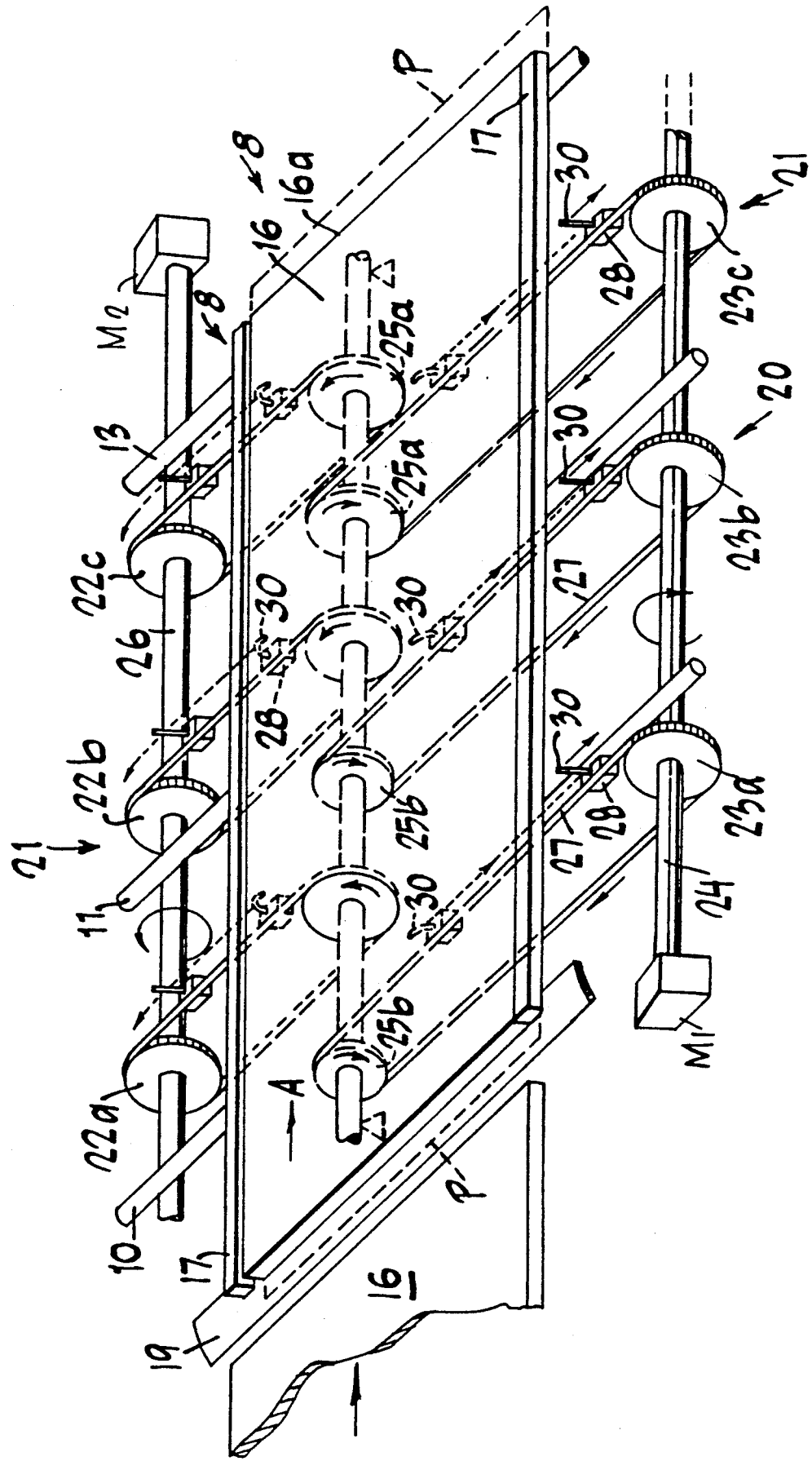
FIG. 1 is a perspective view of the culling apparatus of the present invention including cross belt culling units.
Figure 2:
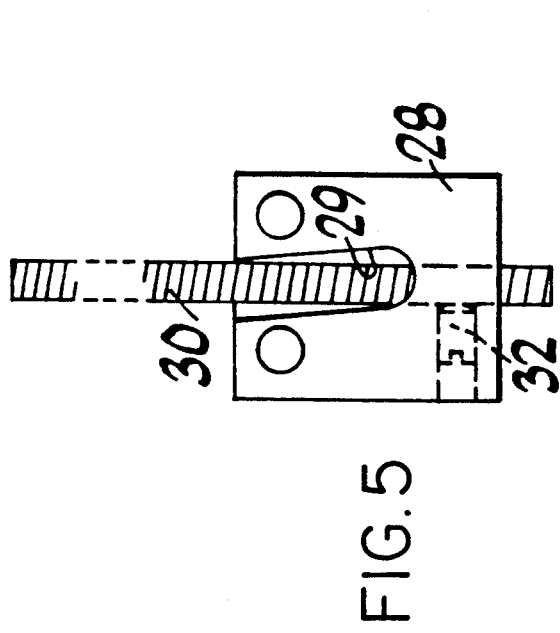
FIG. 2 is a partial elevational view of a cross chain culling unit.

With reference to FIGS. 1–5b, gang ripsaw cut board and strip conveyor system 8 conveys cut board objects using driven rollers 10, 11, 12 in direction A. Upper surfaces of driven rollers 10–12 form a conveying plane P. Cut board conveyor 8 conveys boards 16 of substantial width, length and weight and also conveyor strips 17 of less width, length or weight. Elongated boards 16 with front ends 16a and elongated strips 17 exit a cutter (not shown) pass over lip 19 and are thereafter conveyed on and by rollers 10, 11, and 12. Strips 17, as shown, are about ½ inch in width but strips of varying width, height and length may be culled using the present invention.

Mounted across conveyor 8 in spaced-apart manner are right cross cull units 20 and left cross cull units 21 each comprising driven sprockets 22a-c and driven sprockets 23a-c. Sprockets 23a-c are mounted on drive shaft 24 turned by motor $M_1$. Sprockets 22a-c turn on shaft 26 driven by motion $M_2$. Each unit 20, 21 also includes a chain 27 carrying one or more blocks 28 each having an upstanding finger 30 mounted in slot 29. Units 20, 21 also include inner layer idler sprockets 25a and inner small idler sprockets 25b. Sprockets 25b are of reduced diameter so that units 23a,b present fingers 30 at varying heights above plane P as they travel from the inner center where fingers 30 extend a lesser distance above plane P to the edge area where fingers 30 extend a greater distance above plane P. Finger 30 extension, so varied, makes the culling action less aggressive in the center and thus provides for better culling.

Figure 5:
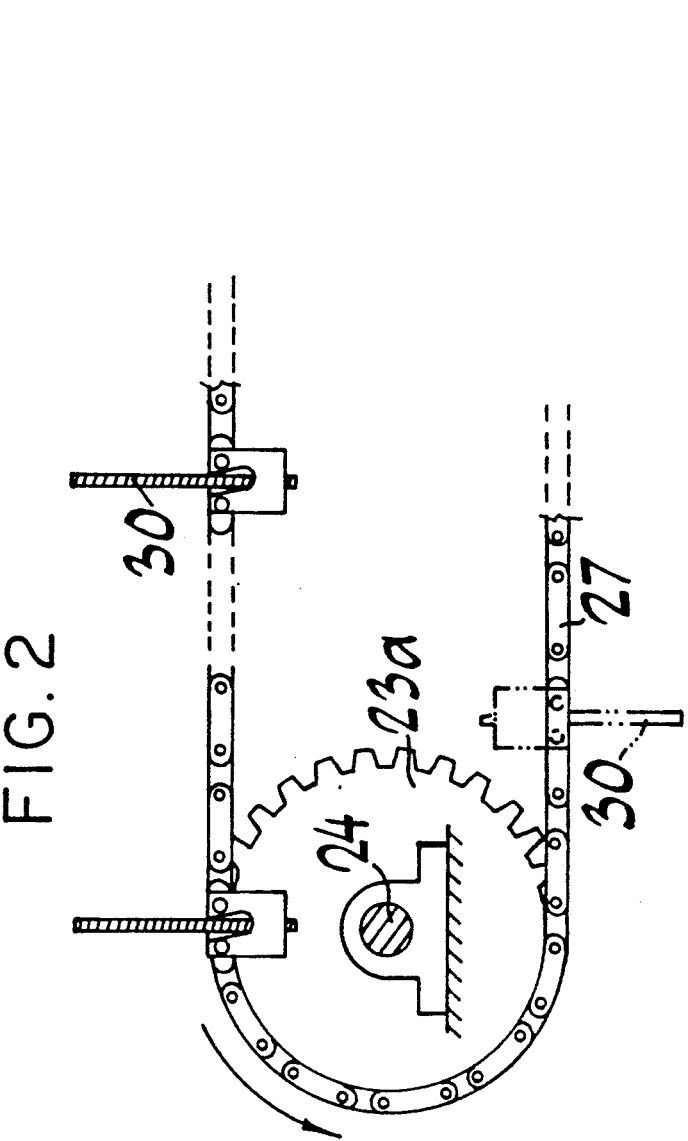
FIG. 5 is an elevational view of a finger holder.

Turning to FIG. 5, angled slot 29 accommodates movement of finger 30 as deflected by the leading edges 16a of boards 16 as they advance through system 8. Fingers 30 are preferably a relatively stiff coil spring but other deflectable elements may be used. The amount the fingers 30 extend above blocks 28 varies the force the fingers 30 apply to boards 16 and strips 17. The heights of fingers 30 are adjustable using set screws 31. Adjustment is accomplished by loosening each nut 32 and after finger adjustment retightening nut 32. The speed of fingers 30 also effects culling.

Figure 3:
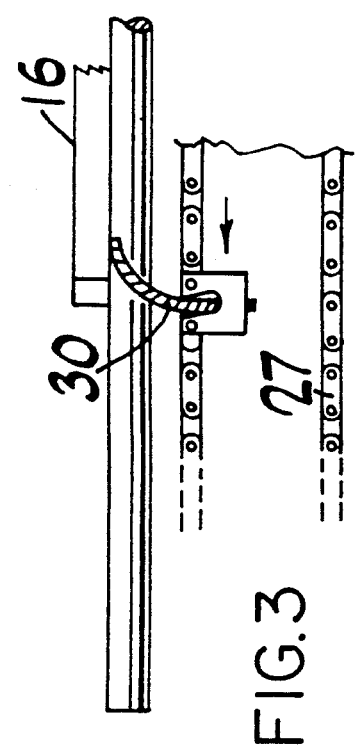
FIG. 3 is a partial elevational side view of a cross chain culling unit engaging a board.
Figure 4:
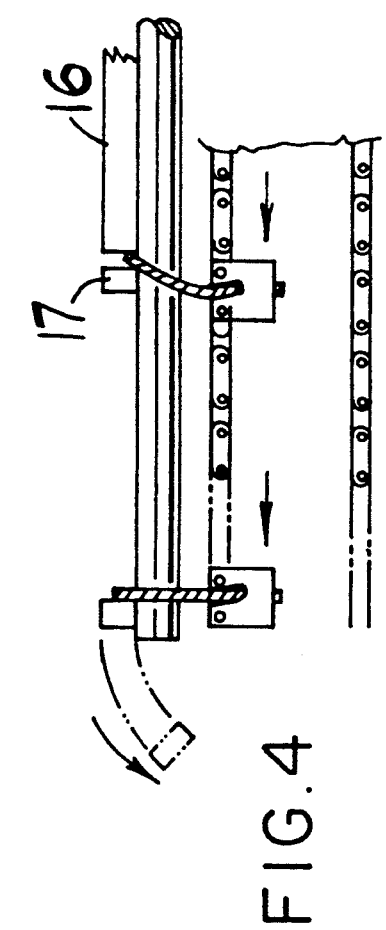
FIG. 4 is a partial elevational view of a cross chain culling unit culling a strip object.

Turning to FIG. 3 and 4, it is seen that finger 30 deflects under board 16 without moving board 16 left or right any significant distance but when finger 30 engages the lighter strip 17 it urges it off the conveyor. Fingers 30 are bendable under loads applied by boards 16 but not significantly bendable under loads applied by strip 17 so that the paths of boards 16, as they are conveyed, are not substantially altered by fingers 30 while strips 17 are culled out and removed, left or right, from conveyor 8.

Turning finally to FIGS. 5a, 5b, an alternative block 28' is shown having block cavity 29' which includes forward portion 29a and curved side portion 29b. When a board end 16a engages finger 30 it is deflected out of portion 29b and forward into cavity portion 29a where it is readily bent forward (FIG. 5a). When board 16 or strip 17 resists finger 30 sideways movement it keeps finger 30 in cavity portion 29b which effectively shorten the length of finger 30 making the finger stiffer with greater deflecting power (FIG. 5b). Thus, finger 30 remains in portion 29b except when acted on by the front end 16a of a board 16.

I claim:

1. In a conveyance apparatus in which a plurality of objects having variable resistance to sideward movement during their conveyance are conveyed in a plane in a first direction, an object culling device comprising flexible finger means mounted on transport means moving in a second direction below such plane with the finger means extending above said plane, whereby certain objects conveyed will be engaged by the fingers to remove them from either side of the conveyance apparatus.

2. The conveyance apparatus of claim 1 in which the transport means move substantially perpendicular to said first direction.

3. The conveyance apparatus of claim 2 in which the transport means is a sprocket-driven endless chain carrying a plurality of finger means adjustable to varying heights above said plane.

4. The conveyance apparatus of claim 1 in which the finger means is continually moving.

5. The conveyance apparatus of claim 1 in which the height above the plane of the finger means varies as the finger means moves in such second direction.

* * * * *

UNITED STATES PATENT AND TRADEMARK OFFICE
CERTIFICATE OF CORRECTION

PATENT NO.   :   5,165,519

DATED        :   November 24, 1992

INVENTOR(S)  :   Ralph Leo Pund, Reed Douglas Hughes, and Greg Alan Krodel

It is certified that error appears in the above-identified patent and that said Letters Patent is hereby corrected as shown below:

item [75]
Title Page, assignment data omitted.

Should read --Assignee: ARISTOKRAFT, INC., Jasper, Indiana--.
Item [76]
Title Page, the inventors are not listed in proper order.

Should read -- Ralph L. Pund, Rte. 1, Box 193 B, Ferdinand, Ind. 47532; Reed D. Hughes, Rte. 10 Box 365 E, Crosswell, Tenn. 38555, Greg A. Krodel, 715 Clay, Jasper, Ind. 47546.

Column 2, line 24, "FIG. 3" should read --FIGS. 3--.

Signed and Sealed this

Eleventh Day of January, 1994

Attest:

BRUCE LEHMAN

*Attesting Officer*   *Commissioner of Patents and Trademarks*